United States Patent [19]

Rhoton et al.

[11] Patent Number: 4,735,463
[45] Date of Patent: Apr. 5, 1988

[54] TRANSIT VEHICLE FRICTION BRAKE DECELERATION CONTROL SYSTEM

[75] Inventors: Richard S. Rhoton, Mt. Lebanon; Andrew S. Robbins, Scott Twp., Allegheny County, both of Pa.

[73] Assignee: Westinghouse Electric Corp., Pittsburgh, Pa.

[21] Appl. No.: 896,537

[22] Filed: Aug. 14, 1986

[51] Int. Cl.⁴ ............................................. B60T 13/74
[52] U.S. Cl. ................... 303/16; 188/106 P; 303/2
[58] Field of Search ............... 303/2, 13, 15, 16, 6 M; 188/106 P

[56] References Cited

U.S. PATENT DOCUMENTS 4,068,899  1/1978  Nolte et al. ................ 303/16 X
4,679,863  7/1987  Ikeda et al. ................ 303/16 X Primary Examiner—Joseph Falk
Attorney, Agent, or Firm—E. F. Possessky

[57] ABSTRACT

An improved friction brake system for a transit vehicle is disclosed. The conventional friction brake system for a transit vehicle utilizes an integral service brake and emergency-parking brake actuator. The service brake portion is air powered while the emergency-parking brake portion is spring powered. It has been conventional to apply full service air brake and emergency spring brake during emergency stops. An accelerometer switch is typically connected in circuit with the service brake portion to prevent the service brake from turning on if their is sufficient deceleration. The accelerometer switch often does not react quickly enough to prevent the onset of the service brakes. The present invention utilizes a time delay switch to delay the onset of service brakes until after the spring-activated emergency brakes react.

1 Claim, 5 Drawing Sheets

TRANSIT VEHICLE FRICTION BRAKE DECELERATION CONTROL SYSTEM

BACKGROUND OF THE INVENTION

The present invention relates to braking systems in general and, in particular, to a friction braking system for a rubber tire transit vehicle. Modern transit vehicles such as used in San Francisco's Bart system and the Orlando and Atlanta airports utilize a combination of dynamic or regenerative braking and friction braking to bring the vehicles to a controlled stop. These modern systems have been described in articles such as "Atlanta Airport People Mover," by Thomas C. Selis, Manager, in the Conference Record of the 28th IEEE Vehicular Technology Group in Denver, Colo., on Mar. 22, 1978, and also in an article "Recent Applications of Microprocessor Technology to People Mover Systems," by Michael P. McDonald et al., in the Conference Record of the 29th IEEE Vehicular Technology Group Conference in Chicago, Ill., Mar. 28, 1979.

U.S. Pat. No. 3,398,992 issued to Joseph C. Littman, dated Aug. 27, 1968, discloses a brake control system for hydraulic brakes on a trailer connected to a towing vehicle. The Littman patent teaches variation of the pressure of the fluid in the hydraulic system to vary the degree of braking. U.S. Pat. No., 4,384,330 issued to Matsuda et al., dated May 17, 1983, discloses a brake control system for an automotive vehicle for controlling application release of brake pressure in order to prevent the vehicle from skidding. Another deceleration control system is disclosed in U.S. Pat. No. 3,751,116 issued to Thomas H. Engle, dated Aug. 7, 1983, which discloses a railway brake controller which modulates the train line brake-controlling signal as required to maintain balance between a command force indicative of a desired rate of retardation and a feedback force developed by a liquid-filled column subject to the actual rate of retardation. Another brake control apparatus is disclosed in U.S. Pat. No. 4,410,154 issued to Thomas C. Matty, dated Oct. 18, 1983, and assigned to the present assignee, which is incorporated herein by reference. The Matty reference discloses a transit vehicle control apparatus which determines a safe brake velocity for a vehicle in relation to a speed control relationship including roadway system design deceleration, the deceleration of the vehicle in relation to inertial space and the deceleration of the vehicle in relation to the roadway. The Matty patent teaches the use of microprocessor-based technology to accomplish braking control.

The typical transit vehicle or "people mover" as part of the braking system includes friction drum brakes of the same type that are used on tractor trailers and which are well known in the art. The friction brakes are controlled by friction brake actuators which are typically integral units having a fail-safe design such that if the actuators suffers loss of air pressure, a spring causes the friction brakes to engage. Referring to FIG. 6A, there is shown a typical deceleration curve upon the application of the emergency brake spring-activated system. As apparent from graph 6A, there is typically an initial spike or a high deceleration rate which may produce an uncomfortable jerk for passengers on the transit vehicle. This spike occurs as a result of the service brakes which are air-activated being fully applied during an emergency stop having a faster response time than the spring-activated system. An accelerometer which is typically connected in circuit with the service brakes is typically too slow to retard the onset of the service brakes even though sufficient deceleration is being supplied by the spring activated system. A typical prior art system producing this response is shown in FIG. 4.

SUMMARY OF THE INVENTION

The present invention is provided in combination with a friction braking system for a transit vehicle. The typical transit vehicle includes a car body, axles mounted to the car body. Wheels are carried by the axles. A braking system is provided, including friction drum brakes mounted on the axles. Friction brake actuators are provided for actuating the friction brakes to retard the rotation of the wheels. Friction brake actuator controls are provided for controlling the friction brake actuators.

The friction brake actuators typically comprise a rod member means for connection to the friction brakes, and an outer chamber enclosing an air-actuated service brake containment portion and also enclosing a spring-activated emergency-parking brake containment portion. The air-actuated service brake containment portion encloses service brake means for moving the rod member means. The spring-activated emergency-parking brake containment portion encloses emergency-parking brake means for moving the rod member means.

The emergency-parking brake means for moving the rod member means includes a spring. The spring-activated emergency-parking brake containment portion includes a first diaphragm affixed to the outer chamber. The interior of the outer chamber proximate the emergency-parking brake containment portion and the first diaphragm define a first air chamber. The first diaphragm, upon air pressure being applied to the first air chamber, causes the spring to be in a compressed condition.

The service brake means for moving the rod member includes a second diaphragm affixed to the outer chamber. The interior of the outer chamber proximate the service brake portion and the second diaphragm define a second air chamber. The second diaphragm, upon air pressure being applied to the second chamber, causes the rod member means to operate the friction brakes.

The friction brake actuator control includes a first electro-mechanical air valve connected in fluid communication with the first air chamber. An air source is provided for supplying air to the first air valve. A second electro-mechanical air valve is connected in fluid communication with the second air chamber and the air source. A power source is provided for energizing the first and second air valves.

An emergency brake control switch is connected in circuit between the power source and the first air valve. A service brake control switch is connected in circuit between the power source and the second air valve. An accelerometer switch is connected in circuit with a power source and the second electro-mechanical air valve.

The improvement of the present invention comprises the accelerometer switch being initially connected in circuit to the power source through the emergency brake control switch. A time-delay switch means is included and is connected in circuit with the accelerometer for switching the accelerometer from being in circuit with the power source through the emergency brake control switch to being in circuit with the power source after a predetermined delay, and by-passing the emergency brake control switch. The service brake control switch prevents the initial onset of the service brake means for moving the rod member means until after the spring means for moving the rod member thereby preventing undesirable jerks of the vehicle during emergency stopping.

BRIEF DESCRIPTION OF THE DRAWINGS

For a better understanding of the invention, reference may be had to the accompanying drawings in which.

BRIEF DESCRIPTION OF THE PREFERRED EMBODIMENTS

Figure 1:
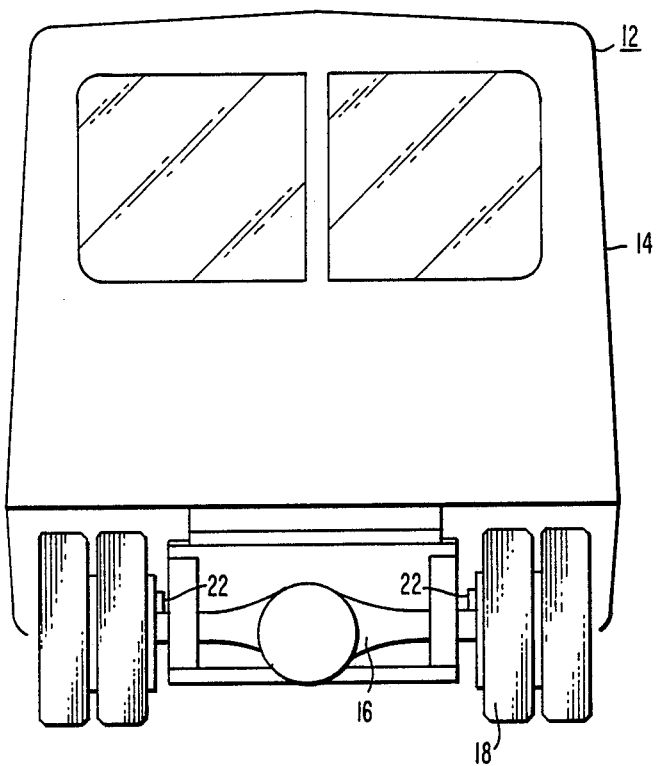
FIG. 1 is a elevational end view of a typical transit vehicle.
Figure 4:
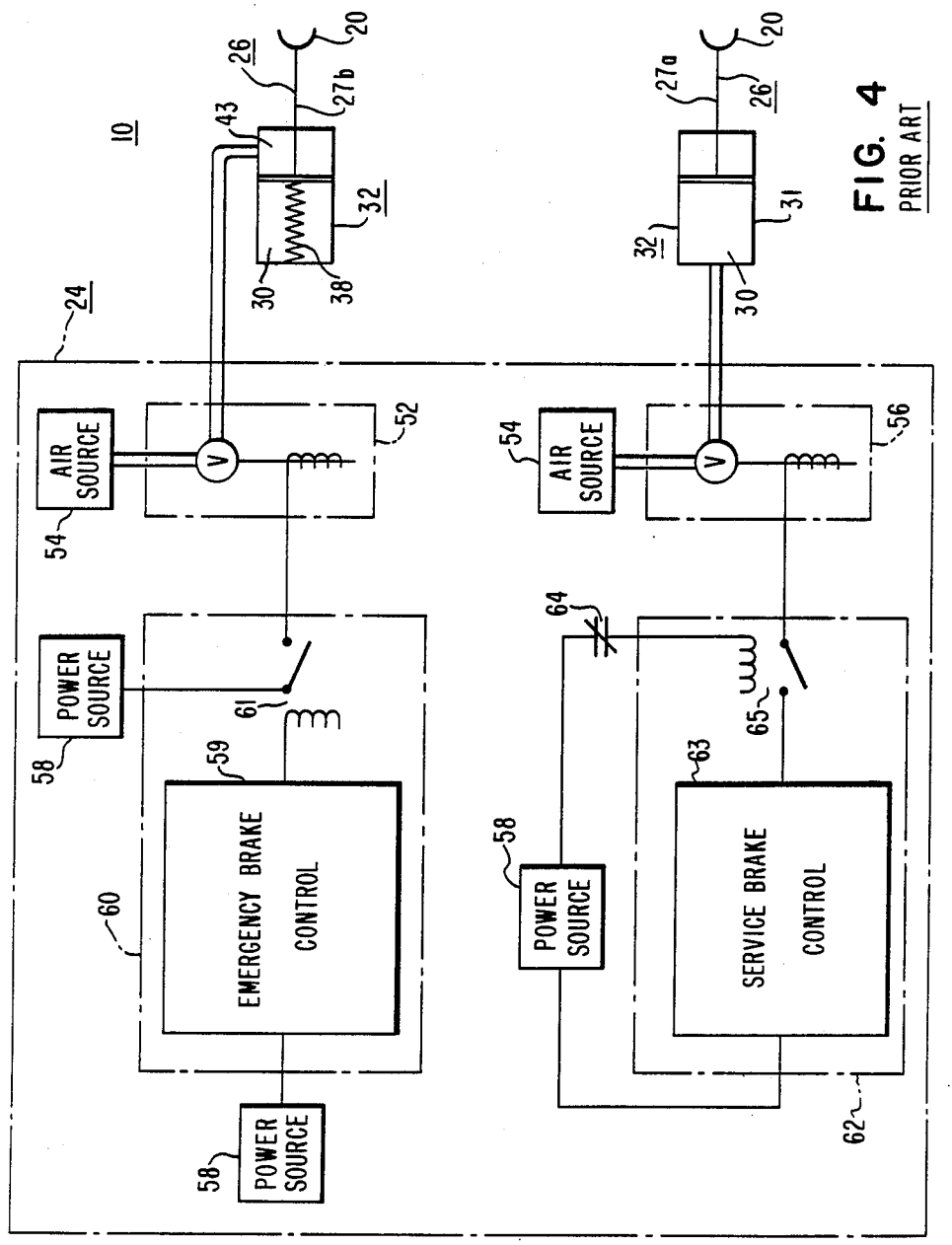
FIG. 4 is a schematic diagram of the prior art friction braking system.

With reference to FIG. 4, there is shown a prior art friction braking system 10 for a transit vehicle 12 such as shown in FIG. 1. The transit vehicle 12 includes a car body 14 and the axle means 16 mounted to the car body. Wheel means 18 which may be rubber tired are carried on the axle 16. The braking system 10, such as shown in FIG. 4, includes friction drum brake means 20 mounted on the axle 16 which is conventional and is not shown. The drum brake means 20 is operated by a combined actuator 22 comprising a service brake actuator 31 and an emergency friction brake actuator means 32

Friction brake actuator control means 24 is provided for controlling the emergency friction brake actuator 32.

Figure 2:
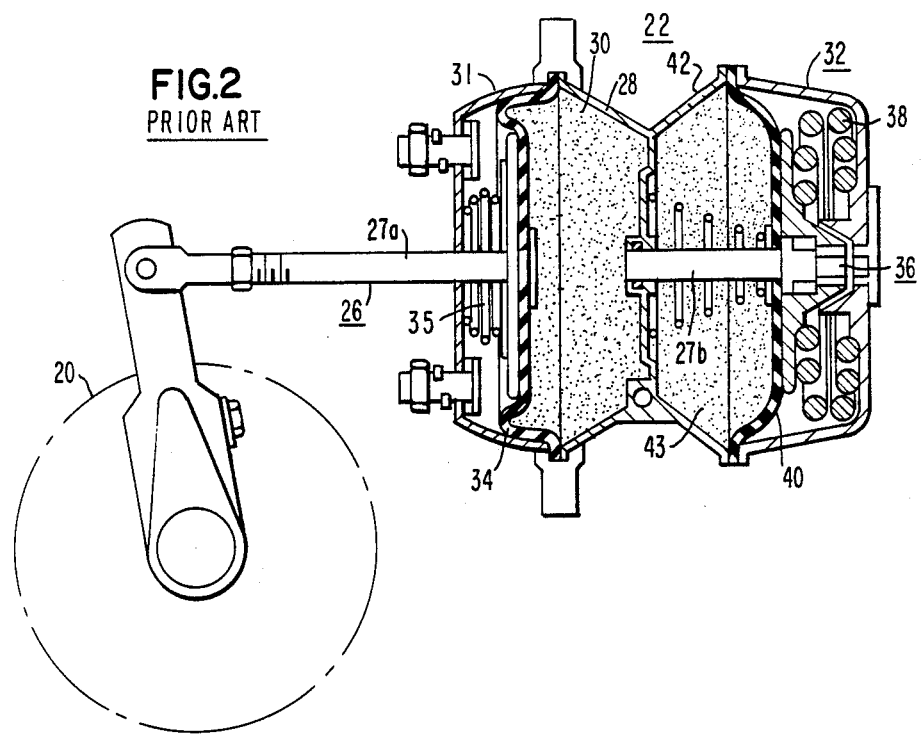
FIG. 2 is a cross-sectional elevational view of a friction brake actuator showing the air-actuated service brake containment portion in the actuated condition, and the spring-activated emergency parking brake containment portion in a spring-off position.
Figure 3:
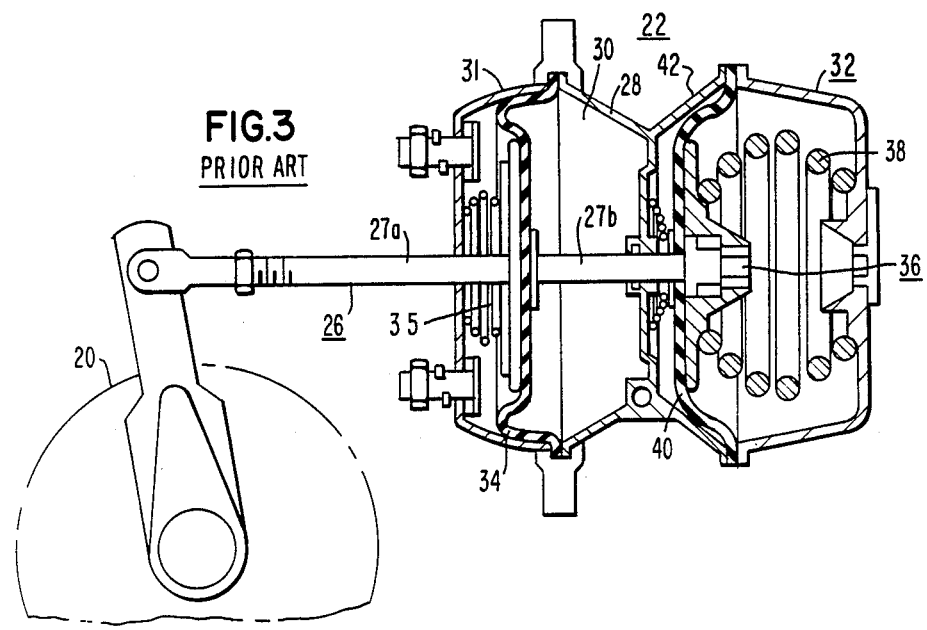
FIG. 3 is a cross-sectional elevational view of the friction brake actuator showing the spring in the parking or emergency position, with the service brake containment portion not actuated by air.

Referring to FIGS. 2 and 3, the emergency friction brake actuator may be such as manufactured by Anchor Lok, Inc. of Culver City, Calif., Model No. 9-16. The combined brake actuator 22 includes a pair of rods 27a, 27b. The rod 27a is connected to the friction drum brakes 20 shown schematically in FIGS. 2 and 3. The service brake actuator assembly 38 includes an outer shall 28 enclosing an air-powered service brake containment chamber 30. The air-powered service brake containment portion 31 encloses service brake means 34 for moving the rod member 27a. The spring-activated emergency-parking brake actuator 32 encloses emergency-parking brake means 36 for moving the rod member 27b through a spring 38. The spring-activated emergency-parking brake actuator 32 includes a first diaphragm 40 affixed to a shell 42 of the emergency actuator 32. Introduction of pressurized air into chamber 43 causes the diaphragm 40 to compress the spring 38 and hold the emergency brake in the off position. Exhausting of air from the chamber 43 allows the spring 38 to operate the emergency.

A service brake diaphragm 34 drives the rod member 27a to operate the friction brake drum means 20. Introduction of pressurized air into the chamber 30 causes the diaphragm 34 to push the rod 27a and operate the friction brakes 24. Retain spring 35 is used to release the service brakes upon removal of air from the chamber 30. Typically, the service brake means for moving the rod means 27a is used for service brakes where the variation of air pressure in the chamber 30 controls the amount of braking effort exerted by the friction brakes 20.

Referring to FIG. 4, the friction brake actuator control means 24 includes a first electro-mechanical air valve means 52 connected in fluid communication with the air emergency brake chamber 43. An air source 54 is provided for supplying air to the first air valve 52. A second electro-mechanical air valve means 56 is connected in fluid communication with the service brake air chamber 30 and the air source 54. A power source 58 is provided for energizing the first air valve 52 and the second air valve 56. Emergency brake control switch means 60 is connected in circuit between the power source 58 and the first air valve 52. Service brake control switch means 62 is connected in circuit between the power source 58 and the second air valve 56. Emergency brake control switch means 60 typically includes emergency brake control 59 and emergency brake contact relay 61. Service brake control switch means 62 typically includes service brake control 63 and service brake contact relay 65. The service brake control 63 and emergency brake control 59 may be microprocessor based controls as disclosed in the aforesaid U.S. Pat. No. 4,410,154 issued to Matty. Accelerometer switch means 64, such as manufactured by Ed Cliff Instruments, a subsidiary of Systron-Donner Corporation of Monrovia, Calif., Model No. 7-600, is desirably connected in circuit with the power source 58 and the second electro-magnetic air valve 56. The friction braking system described thus far is generally conventional.

Figure 5:
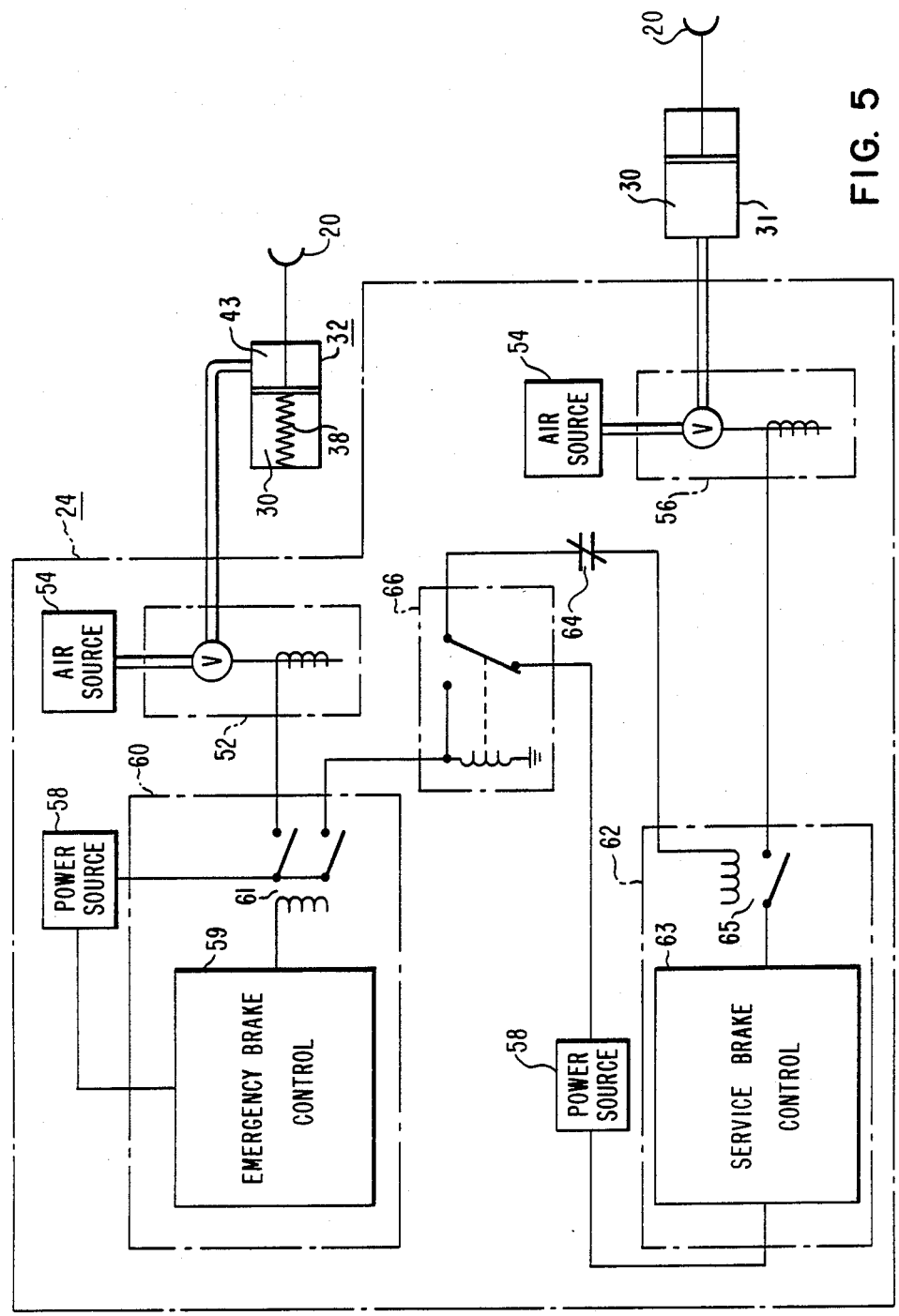
FIG. 5 is a schematic diagram of the friction braking system of the present invention.

The improvement of the present invention entails initially connecting accelerometer switch 64 in circuit with the power source 58 through the emergency brake control switch 60 as shown in FIG. 5. A time-delay switch means 66, such as manufactured by Potter Bromfield, Model CDC38-30025, may be utilized. The Potter Bromfield Switch is a slow-release relay. The time-delay switch 66 is for switching the accelerometer switch means from being in circuit with the power source 58 through the emergency brake control switch means 60 to being in circuit with the power source 58 after a predetermined delay and by-passing the service brake control 62, whereby upon the emergency brake switch 60 being energized, the service brake switch means 62 can only be activated after a predetermined delay, thereby preventing undesirable jerks of the transit vehicle 12 during emergency stopping.

Figure 6A:
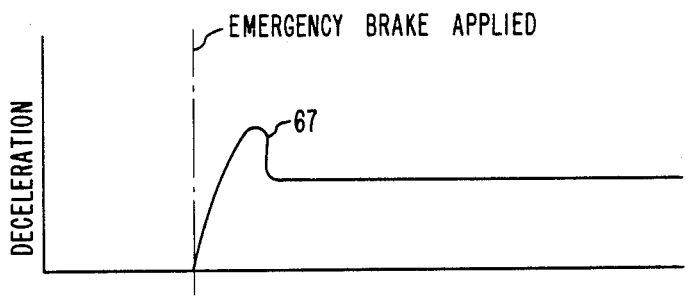
FIG. 6A is a graph showing the deceleration characteristic utilizing the prior art friction braking system upon application of the emergency brakes.
Figure 6B:
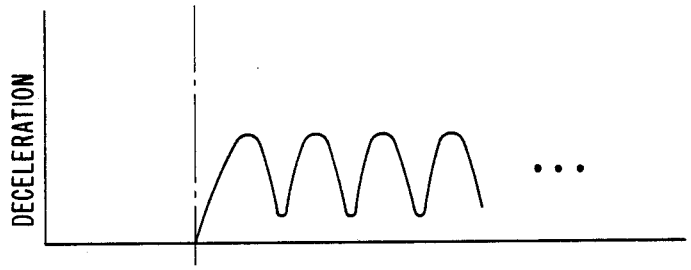
FIG. 6B is a graph of the prior art system showing the deceleration characteristic upon the system experiencing a broken spring in the emergency brakes.
Figure 6C:
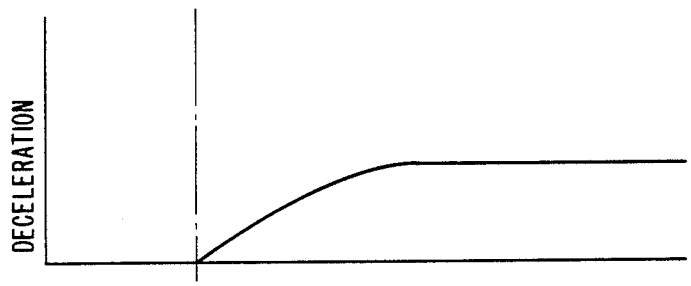
FIG. 6C is a graph of the deceleration characteristic of the present invention upon application of the emergency brakes under normal operation.
Figure 6D:
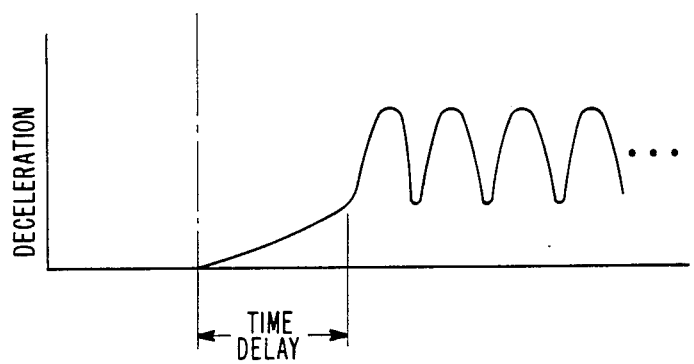
FIG. 6D is a graph of the deceleration characteristics of the friction brake system of the present invention with a spring failure.

With reference to the graph shown in FIGS. 6A–6D, it can be seen that utilizing the present invention, the spike 67 which may be caused by the prior art initial air service brake activation is eliminated by the time-delay of the time-delay switch 66 which can be one second, for example, which permits the spring-activated emergency brake to take effect. If the spring brake is insufficient, the accelerometer switch 64 will permit the air service brake portion 32 to take effect after the time delay. Graphs 6B and 6D indicate that under spring 38 failure the accelerometer switch will successfully close and then open as braking is applied by the air system with an acceptable one-second time delay, as shown in FIG. 6D, occasioned by the time-delay switch 66 of the present invention.

What is claimed is:

1. In combination with a friction braking system for a transit vehicle, said transit vehicle including a car body, axle means mounted to said car body, wheel means carried by said axle means, said braking system including friction brake means mounted on said axle means, friction brake actuator means for actuating said friction brakes to retard the rotation of said wheel means, friction brake actuator control means for controlling said friction brake actuator means, said friction brake actuator means comprising rod member means for connection to said friction brake means, outer chamber means enclosing an air powered service brake containment portion and enclosing a spring powered emergency-parking brake containment portion, said air powered service brake containment portion enclosing service brake means for moving said rod member means, said spring activated emergency-parking brake containment portion enclosing emergency-parking brake means for moving said rod member means, said emergency-parking brake means for moving said rod member means including a spring, said spring activated emergency-parking brake containment portion including a first diaphragm means affixed to said outer chamber, the inner surface of said outer chamber means proximate said emergency-parking brake containment portion and said first diaphragm defining a first air chamber, said first diaphragm upon air pressure being applied to said first air chamber causing said spring to be in a compressed condition, said first means for moving said rod member including a second diaphragm means affixed to said outer chamber means inner surface, the interior surface of said outer chamber means proximate said service brake portion and said second diaphragm means defining a second air chamber, said second diaphragm means upon air pressure being applied to said second air chamber causing said rod member means to operate said friction brake means, said friction brake actuator control means including a first electro-mechanical air valve means connected in fluid communication with said first air chamber, an air source for supplying air to said first air valve means, a second electro-mechanical air valve means connected in fluid communication with said second air chamber and said air source, a power source for energizing said first air valve means and said second air valve means, an emergency brake control switch means connected in circuit between said power source and said first air valve means, a service brake control switch means connected in circuit between said power source and said second air valve means, accelerometer switch means connected in circuit with said power source and said second electro-mechanical air valve means, the improvement which comprises:

said accelerometer switch means initially connected in circuit with said power source through said emergency switch means, a time delay switch means connected in circuit with said accelerometer switch means for switching said accelerometer switch means from being in circuit with said power source through said emergency brake control switch means to being in circuit with said power source after a predetermined delay and by-passing said emergency brake switch means, whereby upon said emergency-parking brake means for moving said rod member means being activated, said service brake means for moving said rod member means can only be activated after a predetermined delay thereby preventing undesirable jerks of said transit vehicle during emergency stopping.

* * * * *